United States Patent [19]
Viola et al.

[11] Patent Number: 5,914,378
[45] Date of Patent: Jun. 22, 1999

[54] ANIONIC COPOLYMERIZATION OF CONJUGATED DIENES AND VINYL ARENES IN THE PRESENCE OF ALKYL ETHERS OF TETRAHYDROPYRANYL METHANOL

[75] Inventors: Gian Tommaso Viola, Cervia; Claudio Trombini; Lorenzo Musiani, both of Bologna, all of Italy

[73] Assignee: Enichem S.p.A., Milan, Italy

[21] Appl. No.: 08/852,688

[22] Filed: May 7, 1997

[30] Foreign Application Priority Data

Jan. 30, 1997 [IT] Italy ................... MI97A0171

[51] Int. Cl.$^6$ ............. C08F 4/48; C08F 236/10
[52] U.S. Cl. ............ 526/181; 526/204; 526/335; 526/340; 526/340.2
[58] Field of Search .................. 526/181, 204, 526/335, 340, 340.2

[56] References Cited

U.S. PATENT DOCUMENTS 5,231,153  7/1993  Hsu et al. ................ 526/340 X
5,470,929  11/1995  Zanzig et al. ................ 526/181

*Primary Examiner*—Fred Teskin
*Attorney, Agent, or Firm*—Oblon, Spivak, McClelland, Maier & Neustadt, P.C.

[57] ABSTRACT

Process for the preparation of a polymer by the polymerization of:

(A) from 50 to 100 percent by weight of at least one diene monomer, (B) from 0 to 50 percent by weight of at least one ethylenically unsaturated monomer, the above polymerization being carried out in an inert solvent in the presence of a catalytic system which comprises:

(a) at least one anionic initiator essentially consisting of a Lithium derivative, (b) at least one modifier belonging to the group of tetrahydropyranyl ethers.

9 Claims, No Drawings

ANIONIC COPOLYMERIZATION OF CONJUGATED DIENES AND VINYL ARENES IN THE PRESENCE OF ALKYL ETHERS OF TETRAHYDROPYRANYL METHANOL

The present invention relates to (co)polymerization processes of conjugated dienes in the presence of particular modifiers, more specifically in the presence of alkyl ethers of tetrahydropyranyl methanol.

The (co)polymerization of conjugated dienes in an inert solvent and in the presence of catalysts based on Lithium produces polymers, such as polybutadiene and the relative copolymers (particularly with styrene), containing about 90% of 1,4 microstructure and about 10% of 1,2 microstructure.

Diene polymers and copolymers with a greater content of 1,2 are of wide interest for particular applications such as tires, molded rubber articles, coatings and similar products.

To increase the content of 1,2, the (co)polymerization is normally carried out in the presence of so-called "modifiers", i.e. substances capable of modifying the content of 1,2 microstructure.

Belonging to the group of modifiers is tetrahydrofuran (THF) which is usually added to the inert solvent in the polymerization phase. This however creates problems in the recovery phase and recycling of the solvent.

U.S. Pat. No. 4,429,091 describes a modifier essentially consisting of oxolanyl alkanes, cyclic and/or linear. With the above modifier a higher % of 1,2 microstructures is obtained with respect to THF.

U.S. Pat. No. 5,231,153 describes a process for the synthesis of elastomeric polymers obtained by copolymerizing styrene and isoprene using tetrahydrofurfuryl ethers.

U.S. Pat. No. 4,367,325 discloses the use of methoxyalkyl tetrahydrofurans and other ethers to obtain random styrene-butadiene copolymers having a content of vinyl of at least 70%. The process described in U.S. Pat. No. 4,367,325 is exclusively an adiabatic process which involves a polymerization time of about 2 hours.

A catalytic system has now been found for the preparation of homo and copolymers of conjugated dienes which overcomes the above disadvantages as it is effective in producing polymers with high yields and a high content of 1,2 microstructure, also at high temperatures.

In accordance with this, the present invention relates to a process for the preparation of a polymer by the polymerization of:

(A) from 50 to 100 percent by weight of at least one diene monomer, preferably selected from isoprene and 1,3-butadiene, even more preferably 1,3-butadiene;

(B) from 0 to 50 percent by weight of at least one ethylenically unsaturated monomer, preferably vinylaromatic, even more preferably styrene, the above polymerization being carried out in an inert solvent in the presence of a catalytic system which comprises:

(a) at least one anionic initiator essentially consisting of a Lithium derivative, (b) at least one modifier belonging to the group of ethers;

the above process being characterized in that the modifier (b) is selected from ethers having general formula (I)

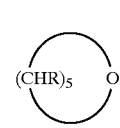

(I)

wherein:
a) a number of R from 1 to 2 is equal to —$CH_2$—O—$R^1$, the others being equal to —H,
b) $R^1$ is a $C_1$–$C_{10}$, preferably $C_1$–$C_5$, hydrocarbon radical, even more preferably selected from methyl and ethyl.

Particularly efficient are modifiers having general formula (I) wherein only one R is equal to —$CH_2$—O—R, the above R being in position 2 of the tetrahydropyranic ring, the other R being equal to H, and wherein $R^1$ is selected from methyl and ethyl; even more preferably $R^1$ is —$CH_3$. In other terms the most preferred modifier is 2-methoxymethyl tetrahydropyrane.

The modifiers of the present invention are very effective, as they allow polymers to be obtained with a high content of vinyl even at high temperatures and consequently very short polymerization times. They are just as effective with low ratios modifier/Lithium.

As mentioned above, the polymers obtained using the modifiers of the present invention are generally elastomeric, which can be obtained with Lithium initiators starting from at least one diene. Diene monomers which can be used are those having from 4 to 12, preferably from 4 to 8, carbon atoms. The above dienes are normally conjugated dienes. Among the most common are isoprene and butadiene. Other dienes which can be used are 2,3-dimethyl-1,3-butadiene, piperylene, 3-butyl-1,3-octadiene, 2-phenyl-1,3-butadiene, etc., alone or in mixtures.

Mixtures containing one or more of the above dienes diluted with low molecular weight hydrocarbons can also be used in the process of the present invention. These mixtures, which are called streams with a low diene content, can be obtained starting from a variety of refinery streams, for example naphtha or gas oil cracking, or they can be mixtures appropriately prepared. Typical examples of low molecular weight hydrocarbons which can be mixed with the dienes are propane, propylene, isobutane, n-butane, 1-butene, isobutylene, trans-2-butene, cis-2-butene, cyclohexene, ethylene, propylene, etc.

As well as in the preparation of homopolymers of dienes, the modifiers of the present invention can be used in the preparation of copolymers with a high vinyl content, of one or more dienes. For example copolymers of isoprene and butadiene with a high vinyl content can be prepared.

In addition, the modifiers of the present invention can be used for preparing elastomeric copolymers or terpolymers, with a high vinyl content, of diolefinic monomers with at least one ethylenically unsaturated monomer, copolymerizable with diolefinic monomers. Typical examples of the above ethylenically unsaturated monomers are vinylidene monomers having one or more $CH_2$=CH—chain-end groups; vinyl aromatics (for example styrene, alpha-methyl styrene, bromostyrene, chlorostyrene, fluorostyrene, etc; alpha-olefins such as ethylene, propylene, 1-butene.

Elastomeric copolymers which are copolymers of at least one unsaturated diene with at least one ethylenically unsaturated monomer, normally contain from 50 to 99% by weight of diene monomer and from 1 to 50% by weight of other olefinically unsaturated monomers.

Copolymers of diene monomers with vinyl aromatic monomers can be used in many applications; a typpical example is styrene-butadiene rubber (SBR), consisting of from 50 to 95 percent by weight of diene monomer and from 5 to 50 percent by weight of vinylaromatic monomer.

Vinyl aromatic monomers probably form the most widely-used group of ethylenically unsaturated monomers in the preparation of copolymers with dienes. These vinyl aromatic compounds are obviously selected so as to be copolymerized with the diene monomer. Any vinyl aromatic compound can be used which is capable of polymerizing in the presence of initiators consisting of alkyl or aryl Lithium derivatives. Vinly aromatic compounds usually contain from 8 to 20 carbon atoms, preferably from 8 to 14 carbon atoms. Even more preferably, the vinyl aromatic compound is styrene. As well as styrene, typical examples of vinyl aromatic compounds are 1-vinyl-naphthalene, 2-vinyl-naphthalene, 3-methylstyrene, 4-propylstyrene, 4-cyclohexylstyrene, 4-dodecylstyrene, 2-ethyl-4-benzyl styrene, 4-(phenylbutyl) styrene.

The relative quantity of conjugated diene(s) and monovinyl derivative can vary within a wide range. In the preparation of elastomeric polymers, the proportion of diene with respect to the vinylaromatic compound should be such as to give an elastomeric copolymer. There is no clear or distinct limit in the ratio diene/vinyl aromatic monomer beyond which elastomeric polymers cannot be obtained, even if the elastomeric copolymer generally contains at least 50 parts by weight of diene. To obtain an elastomer according to the process of the present invention, the weight ratio of diene with respect to the vinyl aromatic compound is usually within the range of 50:50 to 95:5. Mixtures of dienes and mixtures of vinylaromatic compounds can obviously be used.

The (co)polymerization according to the process of the present invention can be carried out in a hydrocarbon solvent which can be aromatic, paraffinic or cycloparaffinic. These solvents normally contain from 4 to 10 carbon atoms per molecule and are liquid under the polymerization conditions. Typical examples of these solvents are butane, pentane, iso-octane, cyclohexane, n-hexane, benzene, toluene, xylene, ethylbenzene, etc., alone or in mixtures.

The modifiers of this invention can also be used in polymerization in mass which is initiated with Lithium catalytic systems.

In polymerization in solution using the modifiers of the present invention, the reaction mixture will contain a quantity of monomers of between 5 and 50 weight percent. The reaction mixture obviously comprises the organic solvent, the monomers, the Lithium initiator and the modifier. In the preferred embodiment, the reaction mixture contains up to 30% by weight of monomers.

The Lithium initiator used in the process of the present invention comprises both monofunctional and polyfunctional derivatives.

The quantity of Lithium initiator used in the process of the present invention can vary depending on the monomers to be polymerized and the molecular weight to be obtained. Normally however from 0.01 to 0.2 phm (parts per hundred parts of monomer) of Lithium initiator are used. Preferably from 0.01 to 0.1 phm of Lithium, even more preferably from 0.025 to 0.07are used.

The selection of the Lithium initiator can depend on the degree of branching and elasticity desired, the type of feedstock, etc. With respect to the type of feedstock to be used, polyfunctional initiators are preferred when the concentration of diene in the stream is low. In fact any possible impurities present in the non-purified stream of diene can react with the Carbon-Lithium bonds, deactivating the initiator.

Polyfunctional initiators which can be used are those which can be prepared by reacting a monofunctional compound of Lithium with a polyvinylphosphine or with a polyvinylsilane, this reaction preferably being carried out in an inert diluent, for example hydrocarbon, and in the presence of a polar organic compound. The reaction between the organo-lithium compound and the polyvinylsilane (or polyvinylphosphine) can cause the formation of a precipitate which can be dissolved, if desired, by the addition of a solubilizing monomer, for example a conjugated diene or a vinylaromatic compound. Alternatively the above reaction can be carried out in the presence of a minimum quantity of solubilizing monomer.

Typical examples of mono organo-lithium derivative are ethyllithium, isopropyllithium, n-butyllithium, sec-butyllithium, ter-butyllithium, ter-octyllithium, n-eicosyllithium, phenyllithium, 2-naphthyllithium, 4-butylphenyllithium, 4-tolyllithium, cyclohexyllithium.

Typical examples of polyvinylsilanes are tetravinylsilane, methyltrivinylsilane, diethyldivinylsilane, di-n-dodecyldivinylsilane, cyclohexyltrivinylsilane, phenyltrivinylsilane, benzyltrivinylsilane.

Typical examples of polyvinylphosphines are trivinylphosphine, methyldivinylphosphine, dodecyldivinylphosphine, phenyldivinylphosphine, cyclooctyldivinylphosphine.

Other polyfunctional polymerization initiators can be prepared starting from mono-organolithium derivatives together with a polyvinylaromatic compound and a conjugated diene or a monovinylaromatic compound or both. These ingredients can be charged initially, usually in the presence, as diluent, of a hydrocarbon or mixture of hydrocarbons and a polar organic compound. Alternatively, a polyfunctional polymerization initiator can be prepared in a two-step process by reacting a mono-organolithium derivative with a conjugated diene or with an aromatic monovinyl compound, and then adding the aromatic polyvinyl compound. Any of the above conjugated dienes or monovinylaromatic compounds can be used.

Typical polyvinylaromatic compounds comprise 1,2-divinylbenzene, 1,3-divinylbenzene, 1,4-divinylben-zene, 1,2,4-trivinylbenzene, 1,3-divinylnaphthalene, 1,8-divinylnaphthalene, 1,3,5-trivinylnaphthalene, 2,4-divinylbiphenyl, 3,5,4-trivinylbiphenyl, m-diisopropenylbenzene, p-diisopropenylbenzene. Divinylaromatic hydrocarbons containing up to 18 carbon atoms are preferred, particularly divinylbenzene, in its ortho, meta or para form, as such or in a mixture.

Alternatively, specific organolithium compounds, either monofunctional or polyfunctional, can be used. These can be represented by the formula $R^1(Li)_x$, wherein $R^1$ represents a hydrocarbon radical with from 1 to 20 carbon atoms and x is an integer from 1 to 4. Typical organolithium compounds are methyllithium, ethyllithium, isopropyllithium, n-butyllithium, sec-butyllithium, ter-butyllithium, ter-octyllithium, n-decyllithium, phenyllithium, 1-naphthyllithium, 4-butylphenyllithium, cyclohexyllithium, 4-butylcyclohexyllithium, dilithium-methane, 1,4-dilithium-butane, 1,10-dilithiumdecane, 1,4-dilithium-cyclohexane.

The modifiers of the present invention can be introduced into the reaction zone in any way. For example the modifier can be charged into the polymerization zone together with the organometallic initiator or separately.

The quantity of modifier can vary depending on the desired content of vinyl in the polymer. For example, if polymers with a low vinyl content are desired, quantities of about 0.1 moles of modifier per mole of initiator metal will be used. If polymers with a high vinyl content are desired, larger quantities of modifier will be used. However there is no reason for using quantities of modifier higher than 40 moles of modifier per mole of initiator metal. It is preferable to use from 0.2 to 10 moles of modifier per mole of lithium, preferably from 0.5 to 5.

With respect to the modifiers of the prior art, the modifiers of the present invention are surprisingly efficient in lower quantities.

It is known to experts in the field that ether modifiers, when used in a high ethyl/Lithium ratio, deactivate the polymerization catalysts, with a consequent modification in the molecular weight distribution curve and molecular weight values themselves. It is therefore important to use modifiers, such as those of the present invention which, the vinyl content of the (co)polymer being equal, can be used in a smaller quantity than the modifiers of the known art, i.e. with lower ether/Lithium ratios.

The polymerization temperature can vary within a wide range from −20° C. to 150° C. In most cases a temperature from 10° C. to 125° C. is preferable. The polymerization can be carried out under both isothermal and adiabatic conditions. It should be noted that, using modifiers of the prior art, the statistic polymerization of dienes and vinyl aromatics is not complete at high temperatures. The modifiers of the present invention on the other hand allow a better randomization of dienes and vinylaromatic compounds even at high temperatures.

As far as the pressure is concerned, this will usually be sufficient to maintain a substantially liquid phase under polymerization conditions.

The polymerization is carried out for a sufficient time to allow an almost complete polymerization of the monomers. In other words, the polymerization is carried out with high conversions.

The polymerization can be terminated using the standard methods, for example by the use of a non-coupling terminating agent, such as water, acids, lower alcohols, or with coupling agents.

Typical examples of coupling agents comprise polyvinylaromatics, polyepoxides, polyisocyanates, polyimines, polyaldehydes, polyketones, polyhalides, polyanhydrides, polyesters (esters of polyhydroxylic alcohols with monofunctional carboxylic acids), diesters (esters of monofunctional alcohols with dicarboxylic acids).

The polymers obtained according to the process of the present invention with the polymerization technique in solution, can be recovered using the conventional methods. In many cases it is preferable to destroy residual carbon-Lithium bonds and then recover the polymer produced. It can also be advantageous to add antioxidants to the polymeric solution to protect the polydiene from harmful contacts with oxygen. The polymer produced can be precipitated from the polymeric solution and possible residues of lithium can be deactivated by the addition of lower alcohols, for example isopropanol. The polymer can be recovered with the usual means, such as decanting, filtration, centrifugation. Stripping in a stream of vapor can be used to remove volatile residues.

The modifiers used in the process of the present invention, which can be carried out both in batch and in continuous, are also efficient at relatively high temperatures.

With respect to polymerization in batch, the modifiers of the present invention offer the possibility of using wider temperature ranges, thus allowing an increase in the concentration of the monomers and also the economic yield of the process.

As far as polymerization in continuous is concerned, a higher temperature allows more rapid kinetics, consequently lower residence times with greater flow rates and therefore better economic yields.

The following examples provide a better understanding of the present invention.

EXAMPLES

PREPARATION OF THPA-m
(methyltetrahydropyranyl ether)

60–70 mmoles (7–8 grams) of 2-hydroxymethyl tetrahydropyrane in 100–200 cc of methylene chloride are poured into a 1 liter flask with mechanical stirring; 28 grams of a water solution at 50% of NaOH with 6–7 grams of triethylbenzylammonium bromide are then added. 100–150 mmoles of dimethylsulfate (12–18 grams) are then added. The flask is then left under stirring for 8–10 hours at room temperature.

The reaction is deactivated by the addition of 2–3 cc of ethyl alcohol and the mixture is left under stirring for a few hours.

The organic phase is subsequently extracted and then dried on a rotating evaporator. The non-reacted alcohol is distilled and the reaction mixture is purified by silica gel chromatography with a mixture of cyclohexane/ether.

POLYMERIZATION OF BUTADIENE

The experimental procedure used is the conventional one (see Morton, in Anionic Polymerization: Principles and Practice, Academic Press, New York 1983) with Lithium catalysis.

A typical example is the following: 700 grams of solvent (cyclohexane), 15 grams of butadiene, the desired quantity of modifier (typically 0.6–07 mmoles) and 0.05–0.07 grams of n-butyllithium are charged into a 1 liter reactor.

The temperature is that indicated in the examples and remains almost constant during the polymerization, owing to the high dilution and great thermal capacity of the reactor used.

The reaction proceeds until complete conversion (typically in 10 minutes at 80° C. and 2–3 hours at 25° C.) and the active center is then deactivated with the addition of water (1–2 mmoles). An antioxidant (BHT, 0.15 phr) is added to the polybutadiene thus obtained and the solvent is eliminated by stripping with steam. Alternatively the polymer is coagulated by the addition of a non-solvent (ethanol). GPC is carried out on the polymer to verify the ether/Lithium ratio used and also IR analysis, with measurement of the microstructure.

The data of the tests carried out both in the presence of the modifiers of the present invention and in the presence of modifiers of the prior art, are shown in table 1.

In the above table (as in the subsequent tables relating to copolymerization), the abbreviation THPA-m indicates 2-methoxymethyl tetrahydropyrane (compound having general formula I wherein the substituent is in position 2 and $R^1$=—$CH_3$), THPA-et indicates 2-ethoxymethyl tetrahydropyrane (compound having general formula I wherein the substituent is in position 2 and $R^1$=—$CH_2CH_3$), THFA-m indicates 2-methoxymethyl tetrahydufuran (also called methyl tetrahydrofurfuryl ether), THFA-et indicates 2-ethoxymethyl tetrahydrofuran, also known as ethyl tetrahydrofurfuryl ether. The derivatives of tetrahydrofuran are cited for comparative purposes as they are used in the process described in U.S. Pat. No. 5.231.153.

The tables indicate the polymerization temperature, the molar ratio modifier/Lithium and the vinyl content of the polybutadiene produced. The vinyl content refers to the percentage ratio between the double vinyl bonds (1,2) and all the double bonds present in the polymeric skeleton.

TABLE 1

Homopolymerization of butadiene

| Example N° | Ether | Temp. °C. | Vinyl % (1,2/total) | Ratio ether/Li |
|---|---|---|---|---|
| 1 | THPA-m | 25 | 74.7 | 0.7 |
| A1 comp | THFA-m | 25 | 73.4 | 0.7 |
| 2 | THPA-et | 25 | 80.5 | 1.1 |
| A2 comp | THFA-et | 25 | 79 | 1.1 |
| 3 | THPA-m | 50 | 64.2 | 0.7 |
| A3 comp | THFA-m | 50 | 58.4 | 0.7 |
| 4 | THPA-et | 50 | 58.3 | 1 |
| A4 comp | THFA-et | 50 | 56.9 | 1 |
| 5 | THPA-m | 80 | 46.6 | 0.7 |
| 5b | THPA-m | 80 | 50.5 | 2 |
| A5 comp | THFA-m | 80 | 37.5 | 0.7 |
| 6 | THPA-et | 80 | 40.5 | 1 |
| A6 comp | THFA-et | 80 | 40.2 | 1 |

The data of table 1 show that the THPA-m of the present invention has a performance more or less equal to that of THFA-m at 25° C., whereas at higher temperatures (much more interesting from an industrial point of view) THPA-m allows the production of polybutadiene with a decidedly higher vinyl content than that obtained in the presence of THFA-M, with the same modifier/Lithium ratio.

THPA-et, on the other hand, with the same ether/lithium ratio, does not give much better results than those obtained in the presence of THFA-et.

SYNTHESIS OF POLYISOPRENE

The polymerization is carried out as described above for butadiene. The results are shown in table 1a.

TABLE 1a

| Test | Ether | Temp. °C. | 3,4 units % | ether/Li ratio |
|---|---|---|---|---|
| IPR/1 | THPA-m | 80° C. | 31 | 0.95 |
| IPR/2 comp | THFA-m | 80° C. | 18 | 0.95 |

The data from the table show how also in the case of polyisoprene the use of the ether of the present invention allows an increase in the content of 3,4 units with respect to the ethers of the prior art.

SYNTHESIS OF STYRENE-BUTADIENE COPOLYMERS

For the synthesis of butadiene-styrene copolymers, the procedure is similar to that described for the homopolymerization of butadiene and involves, as well as the addition of the second monomer before the introduction of lithiobutyl, the removal of samples for GC analysis of the initial monomeric composition. After the addition of the initiator other samples are contemporaneously taken with a low conversion (10–15% max.) and the variation of the composition of monomers is measured, again by GC. When the conversion is complete the same procedure described above is repeated for the homopolymer by means of GPC and IR analyses. The data of the tests are indicated in table 2.

TABLE 2

Copolymerization butadiene/styrene

| Example N° | Ether | Temp. °C. | Styrene % | Vinyl % | Ether/Li ratio |
|---|---|---|---|---|---|
| 7 | THPA-m | 25 | 26.9 | 67.6 | 0.7 |
| A7 comp | THFA-m | 25 | 29.7 | 66.1 | 0.7 |
| 8 | THPA-m | 50 | 24.9 | 55.6 | 0.7 |
| A8 comp | THFA-m | 50 | 24.4 | 48.8 | 0.7 |
| 9 | THPA-m | 80 | 26.2 | 40 | 0.7 |
| A9 comp | THFA-m | 80 | 24.5 | 33.2 | 0.7 |

The data of table 2 show the greater efficiency of THPA-m with respect ot THFA-m at all temperatures, particularly at 50° C. and 80° C. Of particular importance is the vinyl content of 40% of the copolymer prepared at 80° C. in the presence of THPA-m, with respect to the 33.2% obtained with the comparative modifier.

To evaluate the copolymerization efficiency, using calculation methods of the type Kelen-Tudos (see H. Catalgiz-Giz, A. T. Giz in Macromol. Chem. Phys., 195, 855, 1994) and with confirmation by numerical calculation techniques (see M. Dube, R. Amin Sanayel, A. Penlidis, K. F. O'Driscoll, P. M. Reilly, J. Pol. Sci. Polym. Chem. 29, 703, 1991) the reactivity ratios are measured with high precision (table 3).

This table shows the values of r1=Kbb/Kbs (where Kbb is the homopolymerization kinetics constant and Kbs the cross-over kinetics constant from butadienyllithium to styryllithium) and r2=Kss/Ksb (where Kss is the homopolymerization kinetics constant of styrene and Ksb is the cross-over constant from styryllithium to butadienyllithium).

In an ideal copolymerization the values of r1 and r2 are both close to 1. In fact, as specified in scientific literature, with r1=r2 =1 ideal statistic copolymers are obtained.

TABLE 3

Efficiency in copolymerization

| Example N° | Ether | Temp. °C. | r1 | r2 | Ratio ether/Li |
|---|---|---|---|---|---|
| 10 | THPA-m | 25 | 0.7 | 1.25 | 0.7 |
| A10comp | THFA-m | 25 | 0.9 | 1.15 | 0.7 |
| 11 | THPA-m | 50 | 1.15 | 0.6 | 0.7 |
| A11comp | THFA-m | 50 | 1.18 | 0.35 | 0.7 |
| 12 | THPA-m | 80 | 1.41 | 0.12 | 0.7 |
| A12comp | THFA-m | 80 | 2.18 | 0.14 | 0.7 |

A very important datum in table 3 relates to tests 12 and A12comp. The modifier of the present invention (ex.12) enables an r1 value to be obtained at 80° C. equal to 1.41 against 2.18 of the corresponding methyl tetrahydrofurfuryl ether of the prior art. This means, as shown in table 4, that the copolymerization of styrene and butadiene at a high temperature produces a copolymer with a greater statistic distribution of styrene.

ADIABATIC COPOLYMERIZATION STYRENE/BUTADIENE 1125 grams of butadiene and 375 grams of styrene are charged into a 20 liter reactor under a nitrogen atmosphere. 0.91 grams (7 mmoles) of THPA-m are added and in the comparative example 0.805 grams (7 mmoles) of THFA-m. When the initial temperature reaches 26° C., 0.704 grams (11 mmoles) of butyllithium are added.

The temperature, owing to the high concentration of the monomers, rises from 26° C. to 87° C. The results of the tests, carried out in the presence of the modifier of the present invention and comparative modifiers (THFA-m and ethyleneglycol di-ter-butyl ether abbreviated as EGBE), are shown in table 4. The third column of the above table shows the % of styrene present in the blocks with respect to the total styrene. The term styrene block means a sequence of more than 10 styrene units, as per analysis by ozonolysis.

TABLE 4

| Modif. | % vinyl | St.blocks/Tot. st. | Ether/Li |
|--------|---------|---------------------|----------|
| THPA-m | 50      | 0.9%                | 0.7      |
| THFA-m | 44.4    | 4.8%                | 0.7      |
| EGBE   | 45      | 30%                 | 0.7      |

The results of table 4 show that, with the same ratio between ether and Lithium, the modifier of the present invention supplies a styrene/butadiene copolymer having a significantly higher content of vinyl units with respect to that obtained with the modifier of the prior art. In addition the % of block styrene is decidedly lower than that obtained using the modifiers of the prior art.

We claim:

1. A process for the preparation of a polymer comprising, polymerizing at a temperature of at least 50° C. or under adiabatic conditions a monomer selected from the group consisting of:

a) butadiene,
   b) isoprene, and
   c) butadiene with styrene in an amount of up to 50% by weight of styrene, based on the total amount of butadiene and styrene,
      in an inert solvent in the presence of a catalytic system which comprises
         (i) at least one anionic lithium initiator, and
         (ii) at least one modifier which is 2-methoxymethyl tetrahydropyrane.

2. The process of claim 1, wherein the polymerization is carried out at a temperature of at least 50° C.

3. The process of claim 1, wherein the polymerization is carried out under adiabatic conditions.

4. The process of claim 1, wherein the monomer is a), and the polymerization is carried out at a temperature of at least 50° C.

5. The process of claim 4, wherein the temperature is at least 80° C.

6. The process of claim 1, wherein the monomer is b), and the polymerization is carried out at a temperature of at least 80° C.

7. The process of claim 1, wherein the monomer is c), and the polymerization is carried out at a temperature of at least 50° C.

8. The process of claim 1, wherein the polymerization is carried out at a temperature of at least 80° C.

9. The process of claim 1, wherein the monomer is c), and the polymerization is carried out under adiabatic conditions.

* * * * *